June 5, 1934.  C. A. FAUSEL  1,961,141
TEMPERATURE REGULATING MEANS FOR COOKING APPARATUS
Filed July 29, 1932  3 Sheets-Sheet 3
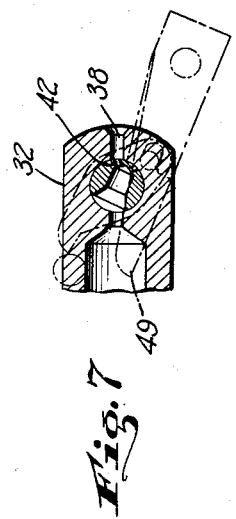
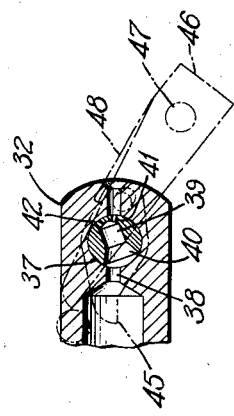
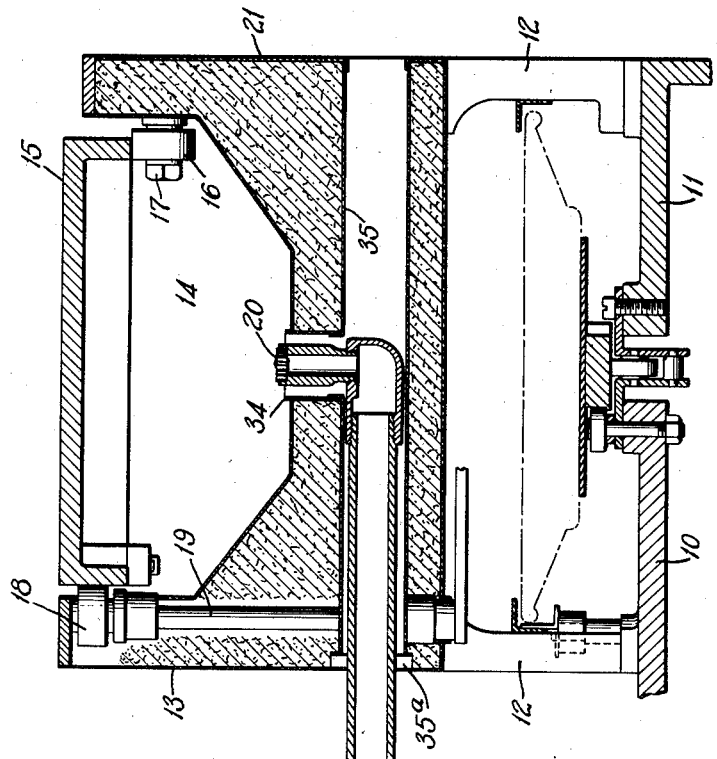
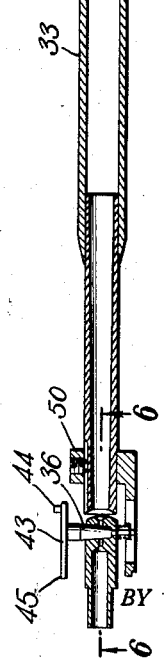
INVENTOR.
CHARLES A. FAUSEL
BY
ATTORNEY.

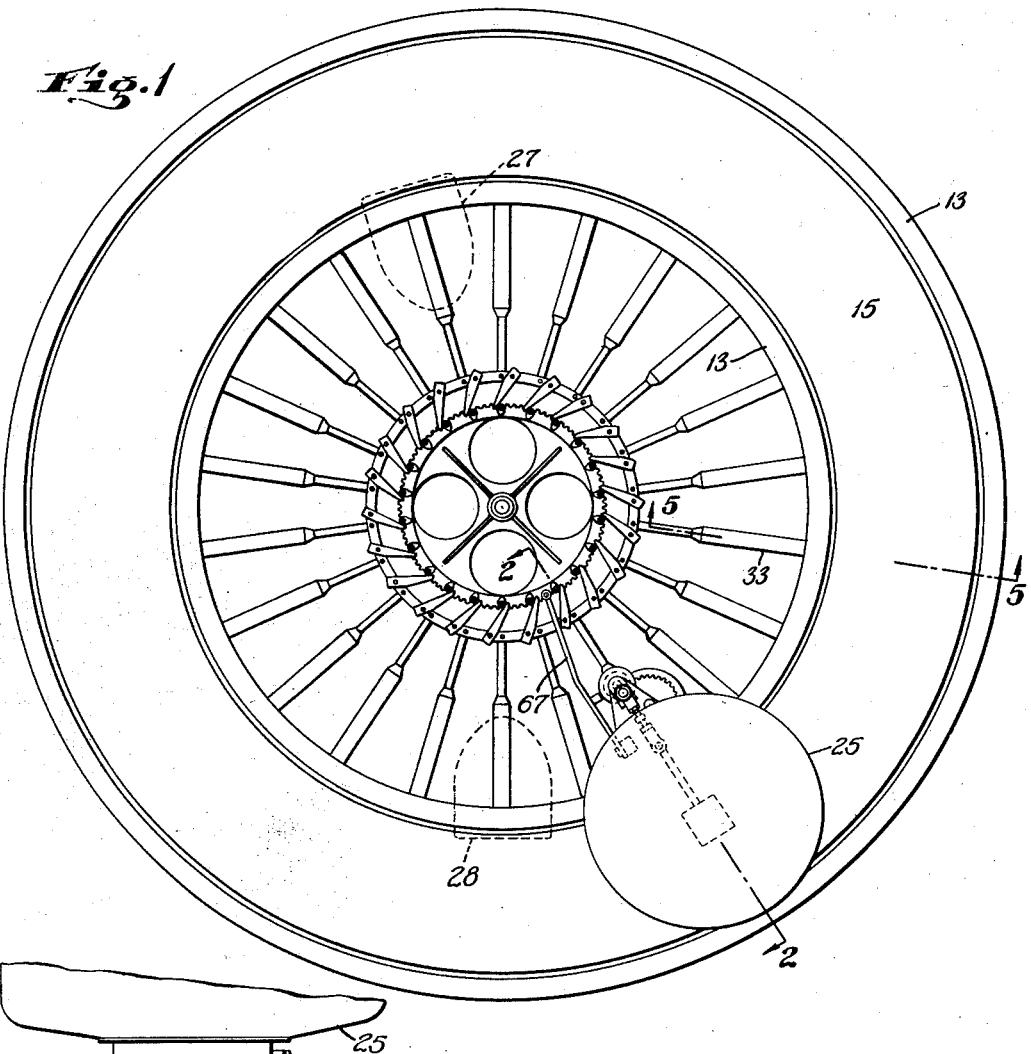
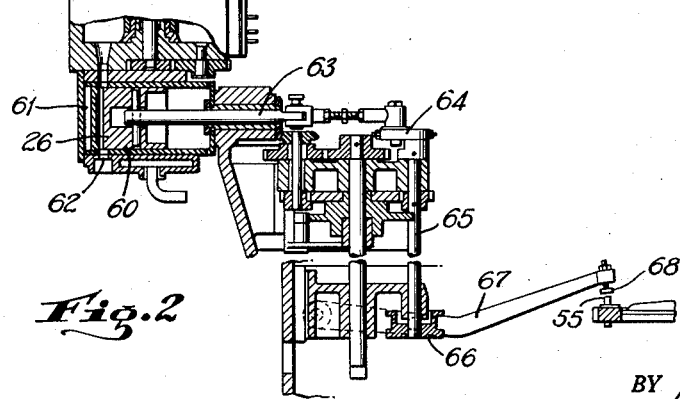

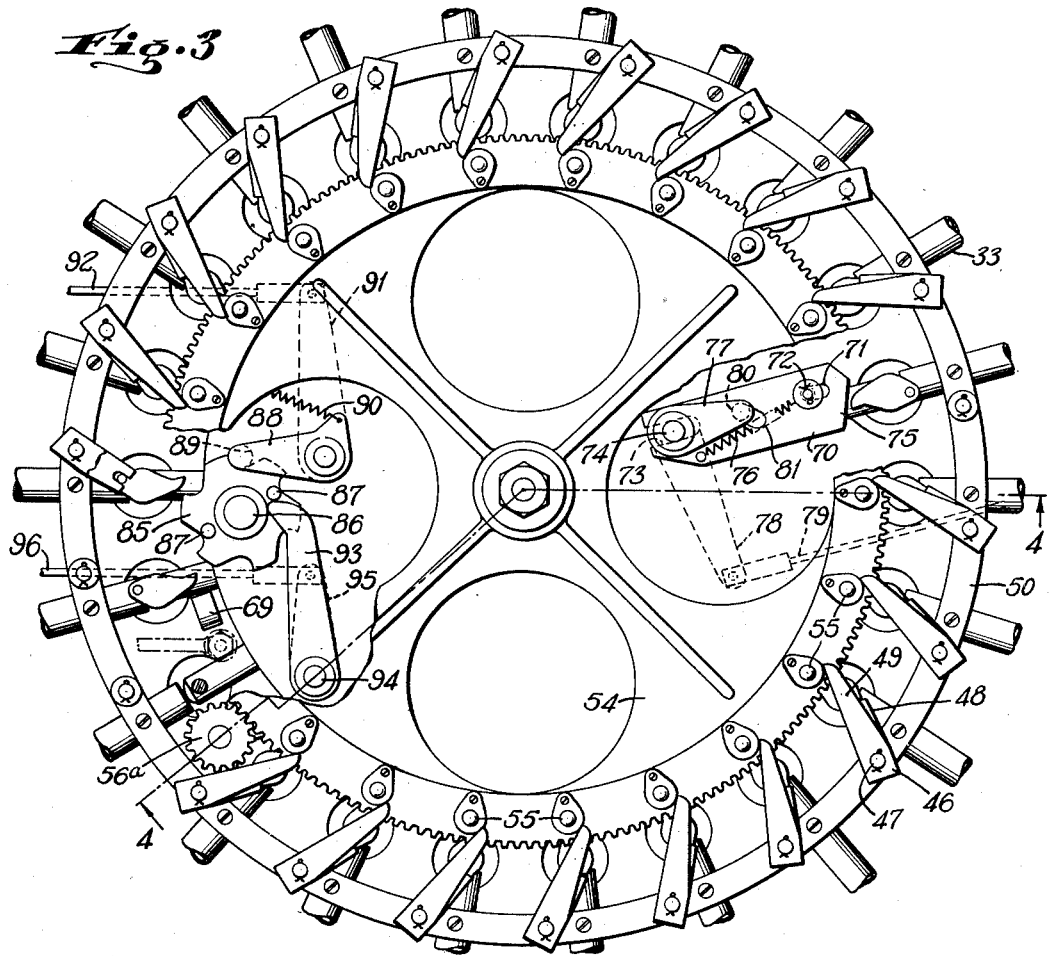
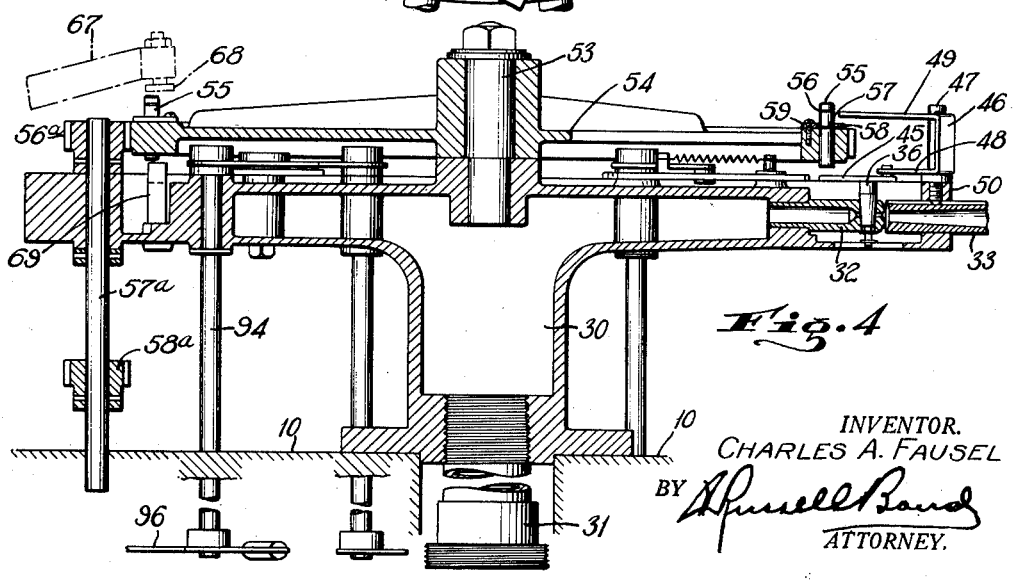

Patented June 5, 1934

1,961,141

UNITED STATES PATENT OFFICE 1,961,141

TEMPERATURE REGULATING MEANS FOR COOKING APPARATUS

Charles A. Fausel, Glenridge, N. J., assignor to Harry Russell Brand, New York, N. Y.

Application July 29, 1932, Serial No. 626,090

19 Claims. (Cl. 53—7)

My invention relates to cooking apparatus and has for an object to provide an improved temperature regulating means therefor.

Another object of the invention is to provide a means for automatically increasing the supply of heat to a cooking surface when food is placed thereon to be cooked.

Another object of the invention is to provide a traveling cooking surface adapted to convey spaced food portions from a receiving point to a delivery point, with means for continuously supplying heat to said surface, and means for increasing the supply of heat to the parts of said surface on which food is being carried.

A more specific object of the invention is to provide a traveling cooking surface on which food is conveyed, with a plurality of fixed heating units therefor and with means for increasing the supply of heat at each unit as the food passes thereby.

My invention is especially applicable to a cake baking apparatus employing a rotary griddle with means for depositing batter thereon at one point, means at another point for removing the baked cakes, and means at an intermediate point for turning the cakes. Such a machine is described in Patent No. 1,848,104, issued March 8, 1932. In said machine the cakes are baked on order and hence there is not necessarily a continuous series of cakes on the griddle. Thus, while the cakes are arranged to occupy definite spaces on the griddle, certain of these spaces may be empty when there is an interruption in the orders. Under such conditions, the heat absorbed from the griddle will not be uniform and if a constant and uniformly distributed supply of heat were furnished to the griddle, either the empty spaces would become overheated or the spaces bearing food would receive insufficient heat. It is an object of my invention to overcome this difficulty by providing means associated with the mechanism for depositing batter on the griddle whereby whenever a portion of batter is deposited the griddle will receive an increased supply of heat and as the batter is carried by the griddle it will be accompanied to the delivery point by a wave of increased heat.

Another object is to provide means set by the deposit of batter or other food on the griddle, which will not only control the supply of heat to said food, but will also initiate the operation of food turning mechanism and food removing mechanism when the food reaches the turning and delivery points respectively, whereby said mechanism will operate only when there is food present for them to operate upon, but will remain inactive when empty spaces of the griddle pass said points.

Other objects of my invention will appear in the following description of a preferred embodiment and thereafter the novelty and scope of the invention will be pointed out in the claims.

In the accompanying drawings;

Figure 1 is a plan view of a griddle cake baking machine provided with my improved heat controlling mechanism;

Fig. 2 is a fragmentary sectional view taken substantially on the line 2—2 of Fig. 1;

Fig. 3 is an enlarged plan view of the central portion of Fig. 1 with parts thereof broken away to reveal certain details;

Fig. 4 is a plane development of a section taken on the irregular line 4—4 of Fig. 3;

Fig. 5 is a fragmental view in section but on an enlarged scale taken on the line 5—5 of Fig. 1;

Fig. 6 is an enlarged sectional view of a valve in throttling position, the section being taken on the line 6—6 of Fig. 5; and Fig. 7 is a view similar to Fig. 6, but showing the valve in wide open position.

The main frame of the machine, as indicated fragmentally in Figs. 4 and 5, comprises a central circular base plate 10 and a surrounding annular plate 11 fixed on suitable supports (not shown). Rising from the plates 10 and 11 are brackets 12 on which is supported an annular casing 13. The casing is formed with an annular recess 14 in its upper face to receive an annular griddle 15. The latter rests on rollers 16 mounted on studs 17 projecting from the outer wall of said recess, and the griddle is held against lateral movement by rollers 18 which bear against the inner periphery thereof. The rollers 18 are carried by vertical shafts 19 supported in the casing. The recess 14 constitutes a heating chamber and projecting into the recess is an annular row of gas burners 20. The casing surrounding the heating chamber is packed with heat insulating material 21 to prevent dissipation of heat through the casing.

Mounted at one side of the machine above the griddle is a batter reservoir 25 provided with a suitable valve 26 (Fig. 2) through which measured portions of batter are deposited on the griddle. The griddle is rotated with a step-by-step movement by suitable gearing, not shown, and in the particular embodiment illustrated there are twenty-two steps to each complete rotation of the griddle. The depositing valve 26 is so timed that it can be operated to deposit batter only during dwells in the intermittent progression of the griddle. Hence, even though the griddle provides a continuous cooking surface, the cakes must occupy definite cake spaces thereon. A portion of batter after being deposited on the griddle is advanced through ten steps, during which time it is thoroughly baked on one side, and during the dwell following the tenth step the cake is picked up by a peel 27 (indicated in broken lines in Fig. 1), and redeposited on the griddle with its baked side up. Thereafter it progresses through ten more steps to a delivery point where it is picked up by another peel 28 and deposited on a plate or other suitable receptacle not shown.

Since there are twenty-two cake spaces on the griddle, I provide twenty-two burners 20 uniformly spaced apart and in such positions that at each dwell of the griddle each cake space thereof will be centered over a burner. The burners 20 are all fed from a common header 30 located at the center of the machine. This header is shown in section, Fig. 4, and is fed from a supply pipe 31. Leading out radially from the header are nozzles 32 through which the gas is directed into radial pipes 33 leading to the burners 20. The nozzles are spaced slightly from the intake ends of the pipes 33 and the latter are properly formed to draw in air which is mixed with the fuel to support combustion at the burners. As shown in Fig. 5, a sleeve 34 surrounds each burner, but is annularly spaced therefrom. This sleeve communicates with a tube 35 through which the pipe 33 enters the casing 13. The tube 35 extends radially through the casing, being provided at its inner end with a plug 35a which forms a support for the pipe 35 passing therethrough. The opposite end of the tube passes through the outer wall of the casing and forms a vent through which air is freely supplied to the burner in the heating chamber 14.

To control the supply of gas fed to each burner, I provide a valve in each nozzle 32. This valve comprises a plug 36 which fits into a tapered vertical bore 37 in the nozzle 32. The plug interrupts the outlet bore 38 of the nozzle. As shown in Fig. 6, the plug is provided with a transverse passage 39 having a flaring mouth 40 at its inlet end which is open to the bore 38 in either of the two positions of the plug shown in Figs. 6 and 7 respectively. At the opposite end of the passage 39 is a pair of outlet ports 41 and 42 respectively. The port 41 is of smaller cross-section area than the port 42. The valve normally occupies the throttling position shown in Fig. 6 with the port 42 cut off and the port 41 aligned with the bore 38 of the nozzle, so that a reduced amount of gas may pass through the valve. However, when the valve is turned to the position shown in Fig. 7, the port 41 is closed and the port 42 is uncovered, thereby permitting an increased flow of gas through the nozzle.

The upper end of the plug 36 is provided with a head plate 43 which carries a pin 44 on the outer side of its axis of rotation, while the opposite side of the plate is formed with a finger 45. To turn the valve, I provide a U-shaped lever 46 mounted on a vertical pin 47. The U-shaped lever has a lower arm 48 which is slotted at its free end to engage the pin 44. The upper arm 49 of the U-shaped lever is longer than the arm 48 and is adapted to engage means presently to be described for controlling the closing of the valve. It will be understood, of course, that there is one of these U-shaped levers for each nozzle. The header 30 is formed with an annular flange 50 in which the pins 47 are threaded and this flange also provides support for the inner ends of the pipes 33.

Mounted to turn on a central stud 53, rising from the header 30, is a wheel 54. The latter is formed with peripheral teeth which are engaged by a pinion 56a. This pinion is fixed to a vertical shaft 57a, driven by gearing 58a from a suitable source of power not shown. The gearing is so timed that the wheel 54 will turn at the same number of rotations per minute as the griddle, but the wheel revolves constantly, whereas the griddle revolves intermittently. The wheel 54 carries a plurality of pins 55, there being twenty-two of these pins, or one for each cake space on the griddle. The pins are slidable vertically in openings through the rim of the wheel 54. Each pin is formed with a pair of annular grooves 56 and 57 respectively adapted to be engaged by an anular spring 58 held in a casing 59 secured to the wheel. In Fig. 4, the pins are shown in raised position with the spring 58 engaging the lower groove 57. In this position, the pins clear the fingers 45 of the valves. However, when a pin is pushed downward so that the upper groove 56 is engaged by the spring 58 it will project sufficiently to engage the fingers 45, provided said fingers are in the normal position shown in Fig. 6. Thus, any pin which is depressed will engage the finger 45 and turn the valve from the position shown in Fig. 6 to that shown in Fig. 7 as the wheel 54 is rotated. However, when this occurs the U-shaped lever 46 will be turned on its fulcrum, projecting the end of the arm 49 into the path of the pins 55, as indicated in broken lines in Fig. 7. The pins which are depressed will pass under the arm 49, but the first pin which is in raised position will strike the arm 49 and restore the valve to the throttling position shown in Fig. 6.

Means are provided for depressing a pin every time the valve 26 is operated to deposit a portion of batter on the griddle. As shown in Fig. 2, the valve is of the type comprising a plunger 60 which is retracted to draw a quantity of batter into a measuring chamber 61 and then is advanced again to force the batter out of said chamber through a discharge port 62. The plunger rod 63 is connected to a crank 64 on the vertical shaft 65, so that by rotation of this shaft the plunger may be operated to deposit measured quantities of batter upon the griddle. The shaft 65 bears at its lower end a cam 66 which engages a pin on a lever 67, so that every time the plunger is retracted the lever 67 is depressed. The lever 67 bears at its outer end a head 68 which is adapted to depress a pin 55 in the wheel 54.

As previously explained, the depositing valve must operate in timed relation to the rotation of the griddle. The parts are thus so disposed that whenever the arm 67 is depressed there will be a pin 55 under the head 68. Hence, whenever a portion of batter is deposited on the griddle, a pin will be depressed, and this pin as it progresses will engage successive valve fingers 45, thereby turning successive nozzle valves to wide open position and causing a wave of increased heat supply to accompanying the deposit of batter to the delivery point. The valves will remain in this position until a pin is encountered which has not been depressed and this pin, as explained above, will strike the arm 49 and restore the valve to throttling position. If the deposits of batter are continued without interruption at each dwell of the griddle, the pins will be successively depressed and the valves will remain in open position. However, whenever, there is an interruption in the feed of batter to the griddle a pin at the depositing point will be left in raised position and this will successively turn off the valve plugs as it passes by them.

Rising from the header 30 at a point immediately preceding the nozzle which controls the fuel supply at the depositing position is a lug 69 formed with an inclined upper end face. Depressed pins 55 in passing over this lug are raised by said end face and restored to their normal position. Thus, the pins 55 are always in raised position when they pass under the head 68.

Not only do the pins 55 control the heat supply but they also serve to initiate the operation of the peels with which the cakes are turned and removed from the griddle. As shown in Fig. 3, I provide at the cake-turning point a slide plate 70 formed near the outer end thereof with a slot 71 engaging a fixed pin 72 and at the inner end with a slot 73 engaging a shaft 74. The outer end of the plate 70 is formed with a cam surface 75 which projects into the path of the pins 55 when the latter are in depressed position, so that when a pin wipes past the surface 75, it will force the plate inward. The plate is normally urged to its outer position, shown in Fig. 3, by means of a spring 76. Fixed on the upper end of the shaft 74 is a crank 77, while secured to the lower end of the shaft is an arm 78 connected by a pull rod 79 to a control device such as a clutch (not shown). The arm 77 is formed with a depending pin 80 which engages a slot 81 set at an angle to the direction in which the plate slides. Whenever a pin 55 passes the plate 70 and forces the latter inward the shaft 74 will be turned by engagement of pin 80 with slot 81, thereby pulling the rod 79 and throwing the clutch. This clutch controls mechanism for operating the peel 27. This mechanism may be similar to that shown in Patent No. 1,848,104, issued March 8, 1932.

The operation of peel 28 is also controlled by a depressed pin 55 through means which will now be described. A star wheel 85 is mounted on a shaft 86 in position to engage a depressed pin 55. As shown, the star wheel has six teeth and located, respectively, at diametrically opposite points on the star wheel, are two pins 87. A crank arm 88 is provided with a pin 89 adapted to engage the star wheel 85 and is normally held in engagement therewith by a spring 90. Fixed to move with the crank 88 is an arm 91 connected by a pull rod 92 to another clutch which controls the mechanism (not shown) that operates the peel 28. Thus, whenever the star wheel is turned by engagement with the pin 55, the arm 88 will be turned on its axis pulling the rod 92 and initiating actuation of the mechanism which operates the peel 28.

The particular machine illustrated is adapted to prepare orders of cakes in which three cakes constitute an order, so that for each order the valve 26 must be operated three times and there will be three successive pins depressed. Hence, when the machine is in operation, as the successive cakes come to the delivery point, the star wheel 85 will be advanced three tooth spaces, whereupon one of the pins 87 will engage an arm 93 fixed on a vertical shaft 94. The lower end of this shaft bears an arm 95 which is connected by a pull rod 96 to a clutch mechanism which controls the feed of receptacles to receive the cakes. This mechanism forms no part of the present invention and hence is not shown in the drawings. Thus, after every third cake has been deposited by the peel 28 the latter clutch will be operated by engagement of a pin 87 with the arm 93, actuating mechanism for carrying the receptacle away with its order of cakes thereon and bringing another receptacle into position to receive the next order.

The operation of the machine will now be clear: The griddle 15 rotates continually with an intermittent motion and the wheel 55 rotates continuously with a constant motion each making the same number of rotations per minute. The peels 27 and 28 remain at rest until there is a cake for them to operate upon. The nozzle valves are normally in throttling position, as shown in Fig. 6, supplying just enough heat to the griddle to keep the latter at a predetermined temperature. The pins 55 are normally in raised position so that they ride over the fingers 45 and just clear the ends of the upper lever arms 48. We shall assume now that an order for cakes has come in. The shaft 65 is turned to operate the valve 26. The plunger 60 draws a measure of batter into the chamber 61, while the griddle is taking a forward step, and then discharges the measure of batter through port 62 as the griddle pauses between steps. During the intake stroke of the plunger 60 the arm 67 is lowered by the cam 66 depressing a pin 55 thereunder. The latter strikes the next adjacent finger 45, turning its nozzle valve to the open opsition, and thus increasing the supply of fuel to the burner at the depositing position, so that the batter discharged by the return stroke of the plunger 60 will be deposited on a spot of the griddle which is supplied with additional heat. The depressed pin 55 will accompany the batter in its orbit, but because the pin moves with constant velocity it will turn on successive nozzle valves just before the batter cake successively pauses over the burners controlled by said valves. Thus, the batter cake will advance on the crest of a wave of heat. If the three cakes constitute an order there will be three successive operations of the valve 26, each accompanied by the depression of a pin 55 and consequently the crest of the wave of increased heat will be wide enough to embrace three cake spaces. The first pin 55 following the three depressed pins will strike successive arms 49 which have been moved into its path by the opening of the nozzle valves and cause the valves to turn back to normal throttling position. As each depressed pin 55 reaches the cake turning position, it rides on the cam face 75 causing the plate 70 to slide inward, thereby rotating shaft 74 and pulling rod 79. By this means actuation of mechanism to operate the peel 27 is initiated. The peel picks up the batter cake, turns it over and deposits it in inverted position on the griddle. The griddle then automatically comes to rest in the position indicated in Fig. 1. As each succeeding cake comes to the turning position the depressed pin accompanying the cake will initiate operation of the peel 27. The cakes continue thence to the delivery position where each pin engages a tooth of the star wheel 85, turning the latter through an angle of one tooth spacing and, through arms 88 and 91, pulling the rod 92. This initiates operation of the peel 28 which picks up the cake, carries it clear of the griddle and deposits it on a suitable receptacle. When the third cake has been deposited on the receptacle one of the pins 87 strikes the arm 93, causing a pull on the rod 96, which initiates operation of mechanism permitting the receptacle to be carried off and bringing another receptacle into receiving position.

Each depressed pin 55, as it passes the lug 69, is restored to normal raised position just before it passes under the presser head 68. It will be noted that the nozzle valve of the burner at the position between the delivery point and the depositing will be opened by a depressed pin before said pin is raised by the lug 69. This permits of preheating the griddle at the spot which on the next step will be in position to receive a deposit of batter. Such preheating is not necessary when no cake has been carried on said spot to the delivery point, but when there is a cake on such spot much of the heat is absorbed by the cake and the heat wave must follow said spot past the delivery point to make up for the heat loss caused by the cake.

While I have described a specific embodiment of my invention, it will be understood that this is to be taken as illustrative and not limitative of my invention, and that I am at liberty to make such changes in form, construction, arrangements of parts and mode of operation as fall within the spirit and scope of the following claims.

I claim:

1. In a cooking apparatus, a series of heating units for cooking food, a controller for each heating unit, means for effecting relative movement of the food with respect to the heating units, and means actuable upon the passage of the food adjacent each heating unit for operating the controller thereof.

2. In a cooking machine, a conveyor providing a surface on which portions of food may be cooked, means for continuously heating said surface, and means for causing a wave of increased heat to accompany each portion of food as it is carried by the conveyor.

3. In a cooking machine, a rotary griddle, means for depositing food thereon, an annular series of burners under the griddle, a fuel valve for each burner, and means set by the deposit of food on the griddle for opening the valves successively in timed relation to the rotation of the griddle, whereby each burner will receive an increased supply of fuel as the food is about to pass thereover.

4. In a cooking machine, a rotary griddle, means for depositing food thereon, an annular series of burners under the griddle, a fuel valve for each burner, means set by the deposit of food on the griddle for opening the valves successively in timed relation to the rotation of the griddle, whereby each burner will receive an increased supply of fuel as the food is about to pass thereover, and means for turning off the valves successively after the passage of the food.

5. In a cooking machine, a rotary griddle, an annular series of stationary heating units under the griddle, a controller for each heating unit normally maintaining the unit at a low heat but movable to maintain the heating unit at a high heat, a member rotatable with the griddle, and selective means carried by said member for operating said controllers successively to increase the heat supplied to a selected area of the moving griddle.

6. In a cooking machine, an annular series of heating units, a controller for each heating unit, a griddle rotatable relatively to said heating units, a wheel also relatively rotatable with the griddle, selective means mounted on said wheel and adapted to be set in either of two positions, said selective means when in one position operating to turn the controllers successively out of normal setting and when in the other position to restore the controllers to normal setting.

7. In a cooking machine, a rotary griddle, an annular series of heating units thereunder, a controller for each heating unit normally maintaining the unit at a low heat but movable to provide a high heat in the unit, a control wheel rotatable with the griddle, a plurality of pins carried by and vertically movable in said wheel, there being a pin for each controller, means for depositing food on the griddle, means cooperating with the food depositing means for depressing one of said pins at each deposit of food on the griddle, and means operable by a depressed pin for turning the controllers successively to high heat position.

8. In a cooking machine, a rotary griddle, an annular series of heating units thereunder, a controller for each heating unit normally maintaining the unit at a low heat but movable to provide a high heat in the unit, a control wheel rotatable with the griddle, a plurality of pins carried by and vertically movable in said wheel, there being a pin for each controller, means for depositing food on the griddle, means cooperating with the food depositing means for depressing one of said pins at each deposit of food on the griddle, means operable by a depressed pin for turning the controllers successively to high heat position, and means actuated by a succeeding pin which has not been depressed for restoring the controllers successively to normal position.

9. In a cooking machine, a rotary griddle, an annular series of heating units thereunder, a controller for each heating unit normally maintaining the unit at a low heat but movable to provide a high heat in the unit, a control wheel rotatable with the griddle, a plurality of pins carried by and vertically movable in said wheel, the pins being normally in raised position, means for depositing food on the griddle, means cooperating with the food depositing means for depressing one of said pins at each deposit of food on the griddle, means operable by a depressed pin for turning the controllers successively to high heat position, and means for automatically restoring depressed pins to normal position.

10. In a cooking machine, a rotary griddle, an annular series of heating units thereunder, a controller for each heating unit normally maintaining the unit at a low heat but movable to provide a high heat in the unit, a control wheel rotatable with the griddle, a plurality of pins carried by and vertically movable in said wheel, the pins being normally raised position, means for depositing food on the griddle, means cooperating with the food depositing means for depressing one of said pins at each deposit of food on the griddle, means operable by a depressed pin for turning the controllers successively to high heat position, means actuated by the next succeeding pin which has not been depressed for restoring the controllers successively to normal position, and means for automatically restoring depressed pins to normal position.

11. In a cake baking machine, a rotary griddle, an annular series of fixed gas burners thereunder, a valve for each burner controlling the supply of gas thereto, each valve in normal position maintaining a reduced supply of gas at the burner and in open position providing an increased gas supply at the burner, a control wheel rotatable with the griddle, a plurality of pins carried by and vertically movable in said wheel, the pins being normally in raised position, means for depositing portions of food on the griddle, means cooperating therewith for depressing one of said pins at each deposit of food whereby a depressed pin will accompany each food portion, and means actuated by the depressed pin for successively turning the valves to open position, whereby a wave of increased heat will accompany each food portion as it is carried by the griddle.

12. In a cake baking machine, a rotary griddle, an annular series of fixed gas burners thereunder, a valve for each burner controlling the supply of gas thereto, each valve in normal position maintaining a reduced supply of gas at the burner and in open position providing an increased gas supply at the burner, a control wheel rotatable with the griddle, a plurality of pins carried by and vertically movable in said wheel, the pins being normally in raised position, means for depositing portions of food on the griddle, means cooperating therewith for depressing one of said pins at each deposit of food whereby a depressed pin will accompany each food portion, means actuated by the depressed pin for successively turning the valves to open position, whereby a wave of increased heat will accompany each food portion as it is carried by the griddle, and means actuated by the next succeeding pin which has not been depressed for restoring the valves successively to normal position.

13. In a cake baking machine, a rotary griddle, an annular series of fixed heating units therefor, a controller for each heating unit adapted normally to maintain a low heat in the unit but movable to a position to provide increased heat therein, a control wheel rotatable with the griddle, a plurality of pins vertically slidable in said wheel but normally occupying a raised position, means for depositing batter on the griddle, a depressor cooperating with the depositing means for depressing one of said pins at each deposit of batter, whereby the depressed pin will accompany the deposit of batter, means operated by the depressed pin for turning the controller successively to high heat position, means operated by the next succeeding pin which has not been depressed for restoring each controller to low heat position, and means for automatically restoring depressed pins to normal position immediately before reaching said depressor.

14. The combination with a cake baking machine comprising a rotary griddle, a series of fixed heating units therefor, means at one location for depositing batter on the griddle, and a peel at another location for turning the batter cakes over on the griddle, of a control wheel rotatable with the griddle, a series of pins vertically slidable in the control wheel, means for depressing one of said pins at each deposit of batter on the griddle, a controller for each heating unit adapted in normal position to provide low heat in the heating unit and in another position to supply a high heat therein, means operable by the depressed pin to turn the controllers successively to high heat position, and means also controlled by the depressed pin for initiating operation of the peel when the batter cake reaches said peel.

15. The combination with a cake baking machine comprising a rotary griddle, a series of fixed heating units therefor, means at one location for depositing batter on the griddle, and a peel at another location for turning the batter cakes over on the griddle, of a control wheel rotatable with the griddle, a series of pins vertically slidable in the control wheel, means for depressing one of said pins at each deposit of batter on the griddle, a controller for each heating unit adapted in normal position to provide low heat in the heating unit and in another position to supply a high heat therein, means operable by the depressed pin to turn the controllers successively to high heat position, means operable by the next succeeding pin which has not been depressed for restoring the controllers successively to low heat position, and means also controlled by the depressed pin for initiating operation of the peel when the batter cake reaches said peel.

16. The combination with a griddle cake baking machine comprising a rotary griddle, a series of fixed heating units therefor, means at one location for depositing batter on the griddle, a turner peel at another location for turning the batter cakes over on the griddle, and a delivery peel at a third location for removing the cooked cakes from the griddle, of a control wheel rotatable with the griddle, a series of pins vertically slidable in the control wheel, means for depressing one of said pins at each deposit of batter on the griddle, whereby a depressed pin will accompany each batter cake, means controlled by the depressed pin for causing a wave of increased heat to accompany the batter cake, and means also controlled by the depressed pin for initiating operation of each of said peels as the batter cake reaches said peels respectively.

17. In a cooking apparatus, a food conveyor, means for depositing food portions at selected points thereon, a plurality of heating units adjacent the conveyor, and selective means set by the depositing means for increasing the heat of each unit selectively only as a food portion passes thereby.

18. In a cooking apparatus, a food conveyor, means for depositing food portions thereon, means for continuously heating the conveyor, and means responsive to the depositing means for causing a wave of increased heat to accompany each food portion as it is carried by the conveyor.

19. In a cooking apparatus, a series of heating units for cooking a portion of food, a controller for each heating unit, means for effecting relative movement of the food portion with respect to the heating units, and means operating said controllers sequentially in timed relation to said movement.

CHARLES A. FAUSEL.